US007004420B2

(12) United States Patent
Stratico et al.

(10) Patent No.: US 7,004,420 B2
(45) Date of Patent: Feb. 28, 2006

(54) DYNAMO-ELECTRIC CORE WINDER

(75) Inventors: Gianfranco Stratico, Siena (IT); Antonio Lumini, Florence (IT)

(73) Assignee: ATOP S.p.A., Florence (IT)

( * ) Notice: Subject to any disclaimer, the term of this patent is extended or adjusted under 35 U.S.C. 154(b) by 0 days.

(21) Appl. No.: 10/779,113

(22) Filed: Feb. 13, 2004

(65) Prior Publication Data

US 2005/0029385 A1   Feb. 10, 2005

Related U.S. Application Data

(60) Provisional application No. 60/447,966, filed on Feb. 13, 2003.

(51) Int. Cl.
  *H02K 15/085*   (2006.01)
(52) U.S. Cl. .................................... 242/432.2; 29/596
(58) Field of Classification Search ............ 242/432.2, 242/432.3, 432.4; 29/596
See application file for complete search history.

(56) References Cited

U.S. PATENT DOCUMENTS

| | | | | |
|---|---|---|---|---|
| 3,768,319 A | * | 10/1973 | Lill | ............................... 74/20 |
| 4,498,636 A | * | 2/1985 | Boesewetter et al. | .... 242/432.3 |
| 6,032,897 A | * | 3/2000 | Ponzio | ..................... 242/432.4 |
| 6,622,654 B1 | * | 9/2003 | Fasino | ........................ 119/57.9 |
| 6,622,955 B1 | * | 9/2003 | Stratico et al. | .......... 242/432.4 |
| 6,749,144 B1 | * | 6/2004 | Komuro et al. | .......... 242/432.5 |

* cited by examiner

*Primary Examiner*—Emmanuel Marcelo
(74) *Attorney, Agent, or Firm*—Robert R. Jackson; Patrick J. Zhang

(57) ABSTRACT

The present invention is concerned with the driving mechanism of winding needles which dispense wire to form the wire coils of a dynamo-electric machine component. Generally, such wire winding is achieved by providing translational, rotational, and radial motions to the winding needle relative to a reference structure of the component. The present invention provides wire winding solutions for causing the winding needles to accomplish predetermined motions with respect to the component so that wire is predictably positioned on the component to form the wire coils. In particular, the present invention provides a driving mechanism with coaxial hollow shafts that impart the necessary motions to the winding needle. In one aspect of the invention, the inner shaft is able to mirror the rotation of the outer shaft to provide rotational motion to the winding needle. In another aspect of the invention, the outer shaft is able to impart both translational and rotational motion via coaxially disposed rotatable sleeves driven by motors. In yet another aspect, all of the winding motions are coordinated using a programmable control mechanism.

26 Claims, 4 Drawing Sheets

DYNAMO-ELECTRIC CORE WINDER

CROSS REFERENCE TO RELATED APPLICATION

This application claims the benefit of priority from U.S. provisional patent application No. 60/447,966, filed Feb. 13, 2003, which is hereby incorporated by reference herein in its entirety.

BACKGROUND OF THE INVENTION

The present invention concerns solutions for winding coils of wire onto dynamo-electric machine components. More particularly, the present invention is concerned with the driving mechanism of winding needles which dispense wire to form the coils by moving with respect to a reference structure (e.g., poles) of the core body of the component.

Wire coils may be wound onto the poles of a lamination core or may be wound onto themselves in components that do not require or possess poles. The wire coils form magnetic fields required in the use of components belonging to dynamo-electric machines. More particularly, the wire coils can be associated with poles of the core body of the components in order to enhance and distribute the magnetic field for generating the final power output required from the dynamo-electric machines. For example, the previously mentioned lamination core may be either a stator core or an armature core of a dynamo-electric machine. The dynamo-electric machine as a whole may be an electric motor, which is used for many types of driving applications.

The ongoing improvement of the performance obtained from dynamo-electric machines has led to various improved geometric designs for the poles of a dynamo-electric machine component. These improved designs usually require extremely variable location of the wire coils. At the same time, the wire turns which form the coils on the component must also be orderly positioned with respect to the poles in order to occupy the areas adjacent to the poles with the maximum amount of wire turns.

In view of the foregoing, it is an object of the present invention to provide wire winding solutions for causing the winding needles to accomplish predetermined motions with respect to the component so that wire is predictably positioned on the component to form the wire coils. It is a further object of the present invention to provide winding needles that accomplish a combination of translational motion, rotational motion, and radial stratification motion with respect to the component. It is a still further object of the present invention to provide coaxial hollow shafts to impart these necessary motions to the winding needle.

These and other objects of the present invention will be more apparent in view of the following drawings and detailed description of the preferred embodiments.

BRIEF DESCRIPTION OF THE DRAWINGS

Non-limiting embodiments of the present invention are described hereinafter with reference to the accompanying drawings in which.

DETAILED DESCRIPTION OF THE PREFERRED EMBODIMENTS

The solutions of the present application are generally related to those described in commonly assigned Stratico et al. U.S. Pat. No. 6,622,955, which is hereby incorporated by reference herein in its entirety.

Figure 1:
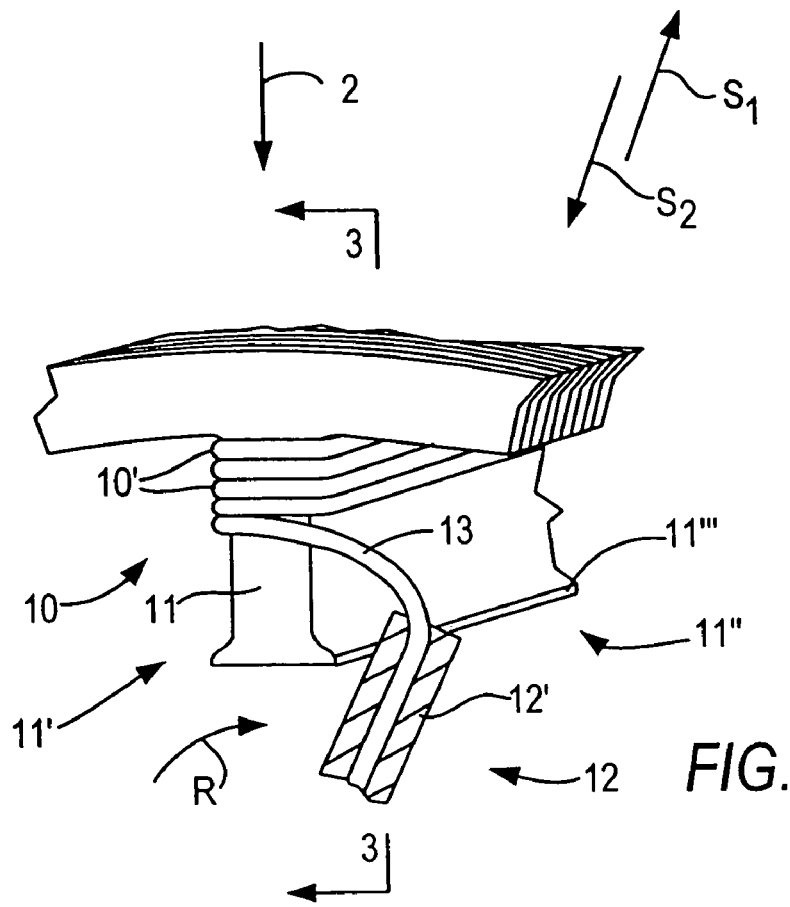
FIG. 1 is a partial axial view of a core body and a partial sectional view of a portion of a winding needle.
Figure 1A:
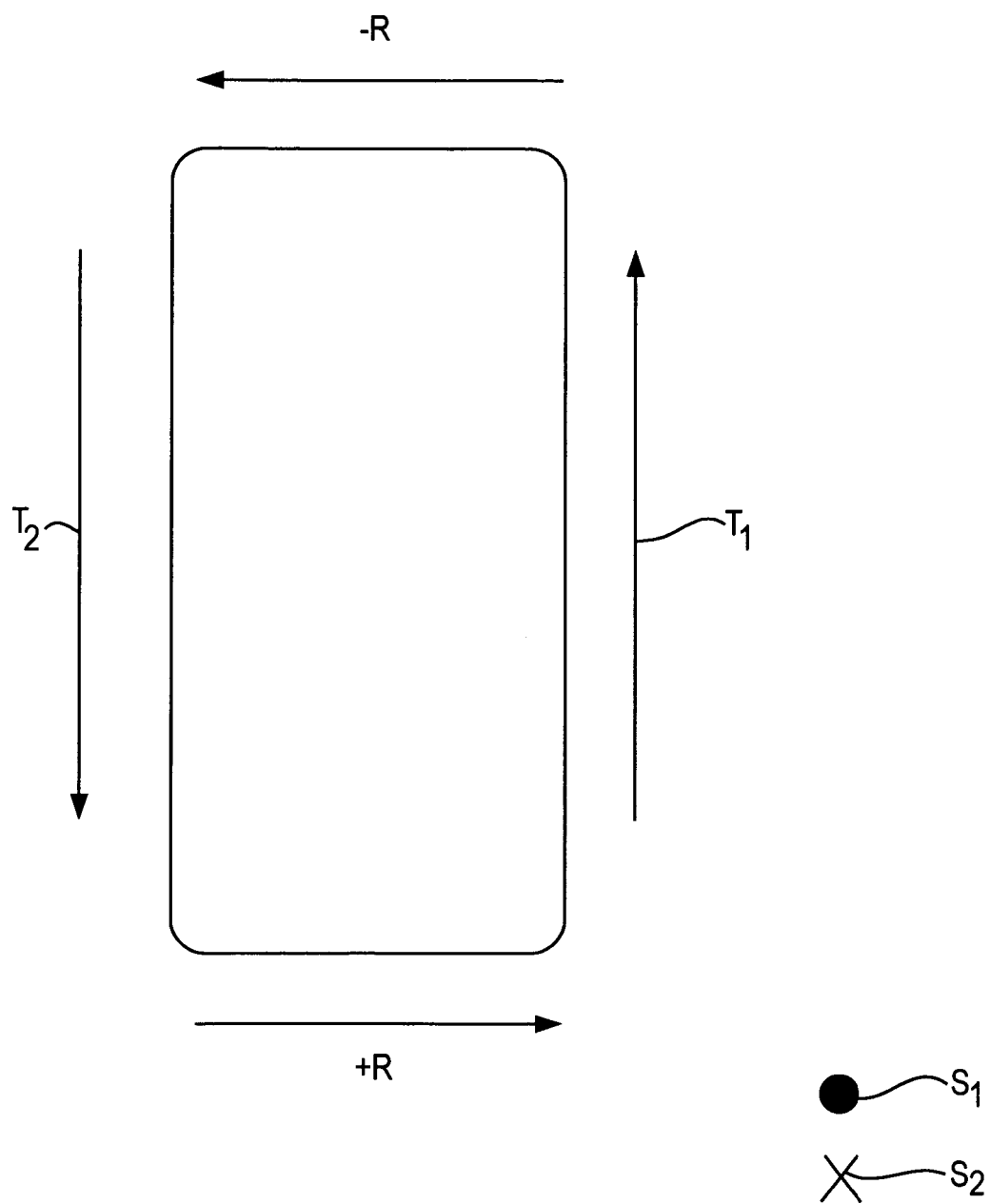
FIG. 1A is a projection of a trajectory used to wind a turn of a coil around a conventional pole from a view similar to that of FIG. 2

Typically, to form a wire turn around a conventional, rectangular shaped pole, the winding needle is moved around the pole with the trajectory shown in FIG. 1A. Such a trajectory would include translation strokes T1 and T2, which would be into and out of the page, respectively, in FIG. 1. These translation strokes move the winding needle along the pole for a travel which starts at one end of the core body and ends at the other end of the core body. Between the translation strokes, when the needle is positioned at the end of the core body, the winding needle accomplishes rotational strokes +R and −R to move from one side of the pole to the other side of the pole. More specifically, with reference to FIG. 1A, at the end of translation stroke T2 (where the winding needle is at the end of the core body closest to the viewer in FIG. 1), the needle accomplishes rotational stroke +R to move from the left side of the pole to the right side of the pole. In FIG. 1, this movement would be analogous to moving needle 12 from side 11' of the pole to side 11" with the needle at the end of the core nearest to the viewer. Similarly, at the end of translation stroke T1, the needle accomplishes a rotational stroke −R. In FIG. 1, this is analogous to needle 12 moving from side 11" of the pole to side 11' of the pole when needle 12 is at the end of the core body that is farthest from the viewer. With reference to FIG. 1A, the combination of these motions (T1, T2, +R, −R) causes the needle to travel around the conventionally shaped pole in order to dispense the wire that forms the turn of a coil. In addition to the translational motions and the rotational motions, radial stratification motions S1 and S2 (out of the page and into the page, respectively, in FIG. 1A) are also provided to regularly stratify the wire turns along the radial extension of the pole. In the following, the rotational strokes +R and −R will be referred to collectively as ±R.

It can be clearly seen that the conventional winding trajectory used in FIG. 1A cannot accommodate a pole with unconventional geometry, such as pole 11 of FIG. 1. FIG. 1 shows that the pole structure is slanted at an angle in its extension between the ends of the core body. This type of pole structure can resemble a helical blade and requires angular rotation of the needle when moving along its slanted axial extension. A pole structure having such a configuration must be wound by a needle which moves to closely follow the slanted contour of the pole structure. The objective of which is to precisely locate the wire and avoid collision with the pole structure itself. Collision most frequently occurs when wire dispensing tip 12' of the winding needle is required to move within the slots formed by adjacent pole structures 11 shown in FIG. 1. In such a situation, the winding needle is required to move between obstacles such as edges 11''' of two adjacent pole structures in order to place wire into spaces 11' and 11''. These additional aspects of placing a wire turn in an unconventional trajectory require the winding needle to achieve motions in addition to motions ±R, T1 and T2, S1, and S2.

The illustrated embodiment of the present invention shows the winding of wire around the pole of a stator core. However, it should be understood that although the following description concentrates on an embodiment in which the wire coils are wound around a single pole, the present invention may be used to simultaneously wind a wire coil through multiple poles. Similarly, the present invention may be used to wind wire coils around virtual poles in which no physical pole exists on the stator core. In the case of a virtual pole, wire coils are wound around each other about a theoretical pole axis on the stator. This type of stator may allow even more wire coils to be placed within a set amount of space in the core and are fully contemplated by the present invention. Although no obstacle such as edge 11''' are present in a virtual pole situation, the winding needle still requires accurate motion along the trajectory shown in FIG. 2 because the turns of specific wire coils need to be located accurately in order to optimize the available spacing of the stator.

Figure 2:
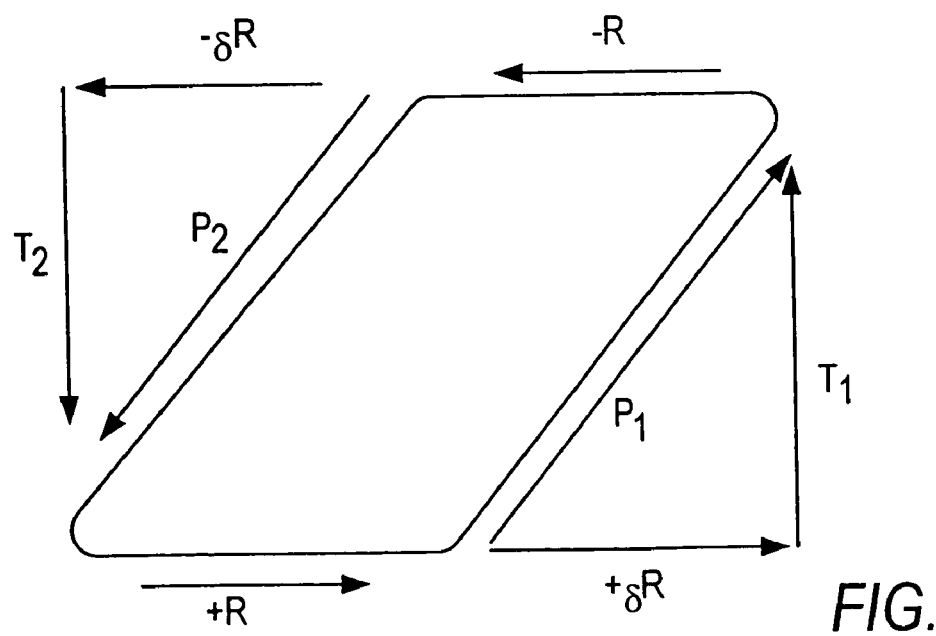
FIG. 2 is a view from direction 2 of FIG. 1 showing the projection of a trajectory accomplished by a portion of a winding needle to wind a turn of a coil around the pole of FIG. 1.

FIG. 2 shows a trajectory required of the wire dispensing tip of a needle in order to wind a turn of a coil around a pole structure like the one shown in FIG. 1. Due to the geometry of pole 11, winding needle 12 must make additional rotational deviations $\pm\partial R$ to accomplish the trajectory shown in FIG. 2. $\pm\partial R$ indicates increments of rotational motion R which may be in the sense of rotation +R or −R. In the case of the trajectory shown in FIG. 2, rotational deviations $\pm\partial R$ need to be applied at least during translations T1 and T2 to obtain the slanted strokes P1 and P2. Otherwise, P1 and P2 would be parallel to translation directions T1 and T2 shown in FIG. 2 and may cause the winding needle to collide with the pole structure.

Figure 3:
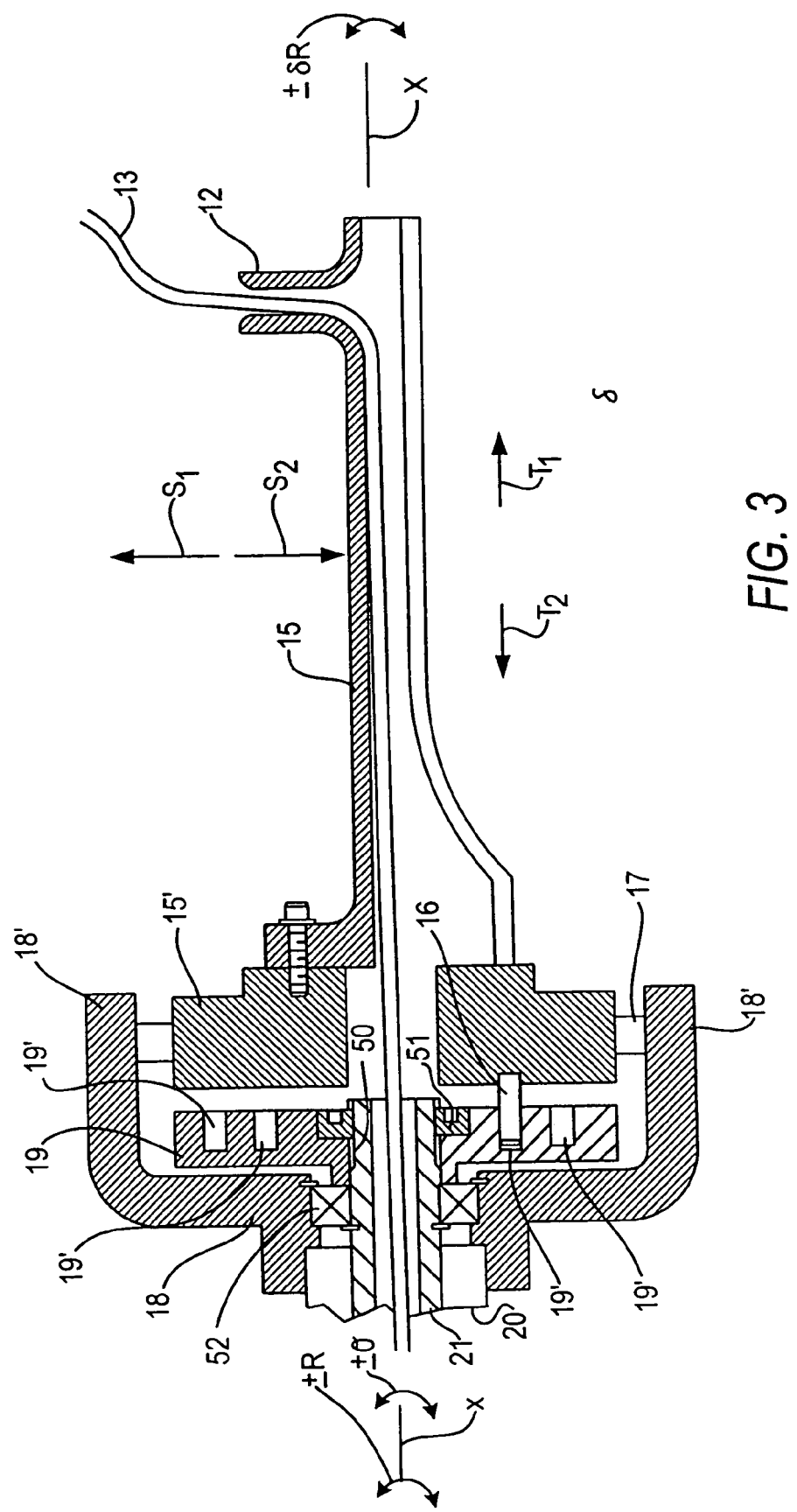
FIG. 3 is a partial sectional view of a winding needle assembly as seen from direction 3—3 of FIG. 1 with the needle portion shown in FIG. 2 positioned in the plane of direction 3—3.

A needle assembly capable of the above-described motions is shown in FIG. 3. More specifically, needle 12 extends from needle arm 15, which is cantilevered from slide portion 15'. Slide portion 15' is assembled on two spaced apart guides 17, of which only one is shown in FIG. 3. Guides 17 are fixed to arm portions 18' of carrier member 18. Disk member 19 is provided with a curved groove 19' (e.g., a spiral curved groove) which receives pin 16 extending from slide portion 15'.

As a result of the above assembly, rotation of disk member 19 with respect to carrier member 18 about reference axis X causes slide portion 15' to move along guides 17 substantially perpendicular to axis X. This radial stratification motion is achieved through the constraint of pin 16 sliding within groove 19'. Needle 12 can accomplish radial translations S1 or S2 by rotating disk member 19 by rotational values $\pm\theta$ around axis X with respect to carrier member 18. $\pm\theta$ indicates a clockwise or counter clockwise rotation of value $\theta$.

In addition to the stratification motion, needle 12 can accomplish rotational motions ±R by simultaneously rotating both carrier member 18 and disk member 19 about axis X with identical rotational values ±R. Furthermore, needle 12 can accomplish translational motions T1 or T2 by simultaneously translating carrier member 18 and disk member 19 substantially parallel to axis X.

Additional motion like rotational deviations $\pm\partial R$ of needle 12 can be accomplished by simultaneously rotating carrier member 18 and disk member 19 around axis X by an increment of $\pm\partial R$. The combination of rotational deviations $\pm\partial R$ with translations T1 and T2 produce strokes P1 and P2 of needle 12, which conform to the shape of pole 11 shown in FIG. 1.

In order to impart these motions to carrier member 18 and disk member 19, carrier member 18 may be fixed to an outer shaft 20 and disk member 19 may be fixed to an inner shaft 21. In the following, it will be shown that outer shaft 20 may be assembled external and coaxial to inner shaft 21 along axis X.

Furthermore, outer shaft 20 and inner shaft 21 may be fixed with respect to each other in the sense of their axial length parallel to axis X, and simultaneously be capable of rotation with respect to each other about axis X.

Outer shaft 20 and inner shaft 21 may be provided with rotational motions ±R and $\pm\partial R$, translation motions T1 and T2, and relative rotation $\pm\theta$. Each of these motions may be individually driven by motors M0, M1, and M2 (which will be more fully described in the following) that may be programmable and controlled to assure that desired values of each motion are achieved with precision, according to required sequences, and at predetermined times. Necessarily, the torque characteristics of the motors are also programmable and controlled to impart each of the motions and to act with a drag effect when required.

Rotational motions ±R and $\pm\partial R$, translational motions T1 and T2, and relative rotations $\pm\theta$ may be combined by control equipment of the winder so that winding needle 12 is able to move with trajectories that match a variety of pole configurations. This capability of the winder will assure successful winding of a variety of pole configurations and produce a predictable placement of the wire turns which form the coils.

Figure 4:
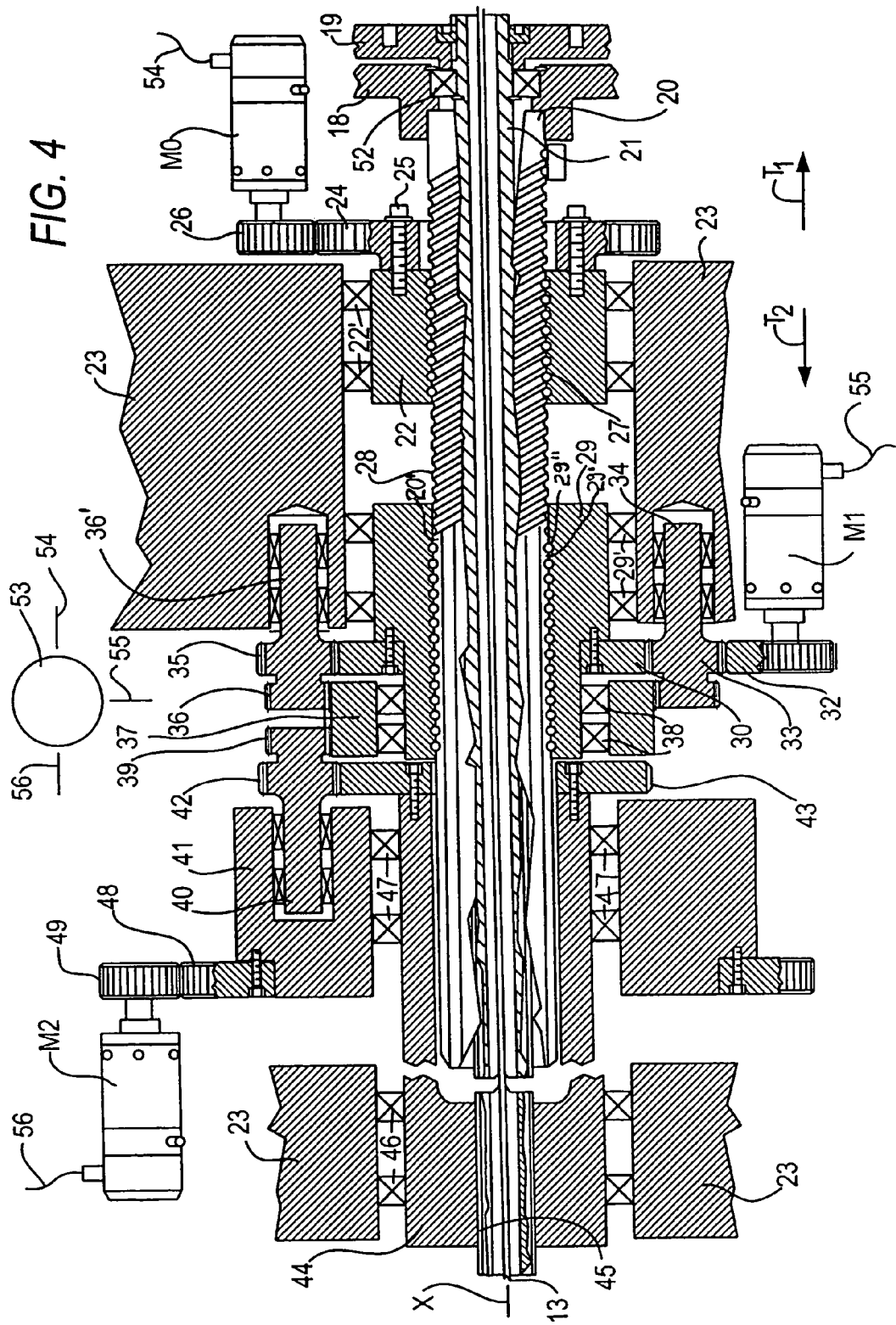
FIG. 4 is a partial sectional view of an embodiment of a driving mechanism for the needle assembly which is a continuation (to the left) of the view shown FIG. 3.

As shown in FIGS. 3 and 4, disk member 19 is fixed to inner shaft 21 by having an internal thread 50 which may be screwed onto a corresponding thread of inner shaft 21. Furthermore, ring nut 51 is also screwed onto the thread of inner shaft 21 to secure disk member 19 against any unwanted loosening. Carrier member 18 is sleeved on to outer shaft 20 and is clamped onto shaft 20 by a clamping member (not shown). Positioning of disk member 19 on inner shaft 21 is further achieved by pushing disk member 19 against axial bearing 52. Axial bearing 52 also abuts against carrier member 18 when the carrier member is clamped to outer shaft 20. In this way, outer shaft 20 and inner shaft 21 are fixed with respect to each other in the axial direction parallel to axis X but remain capable of rotation with respect to each other about axis X.

With particular reference to FIG. 4, front sleeve 22 is assembled on bearings 22', which are in turn assembled in frame structure 23 of the winder. This configuration makes front sleeve 22 capable of rotation around axis X. Gear wheel 24 is assembled to front sleeve 22 by means of a flange type connection using bolts 25. Pinion gear 26 of motor M0 engages gear wheel 24. The inside of front sleeve 22 is provided with channels of a helix, which seat portions of bearing balls 27. Similarly, outer shaft 20 is provided with a corresponding helical channels 28 that seat other portions of bearing balls 27. In this way, rotations imparted by motor M0 are translated into translational motions, such as T1 or T2, of outer shaft 20. The value of these translational motions are proportionally depend the pitch of the helical channels 28 and the number of turns accomplished by motor M0.

As shown in FIG. 4, intermediate sleeve 29 is assembled on bearings 29', which are in turn assembled in frame structure 23 of the winding machine. This configuration enables intermediate sleeve 29 to rotate around axis X. Gear wheel 30 is positioned with respect to intermediate sleeve 29 by means of a flange type connection using bolts (shown but not numbered). Pinion gear 32 of motor M1 engages gear wheel 33. Gear wheel 33 is part of support shaft 34, which is mounted idle on frame structure 23. Gear wheel 33 engages gear wheel 30. The inside of intermediate sleeve 29 is provided with linear keyways 29', which are disposed parallel to axis X. Similarly, outer shaft 20 is provided with linear keyways parallel to axis X. Bearing balls 29" similar to bearing balls 27 have portions placed in both keyways so that key connections are made between intermediate sleeve 29 and outer shaft 20. In this way, rotations imparted by motor M1 result in the transmission of rotational motions such as ±R and ±∂R to outer shaft 20.

As will be shown in the following, rotational motions ±R and ±∂R of outer shaft 20 can be simultaneously and identically transmitted to inner shaft 21. The transmission of identical rotational motion to inner shaft 20 enables disc 19 and carrier member 18 to rotate together simultaneously and by an identical rotational value such that there is no relative rotation between inner and outer shafts. This configuration enables the smooth rotation of needle 12 about axis X and does not allow the winding needle to move radially unless relative rotations ±θ are imparted to the inner shaft by motor M2.

As shown in FIG. 4, gear wheel 30 is engaged by gear wheel 35. Gear wheel 35 is part of support shaft 36' mounted idle on frame structure 23. Gear wheel 36 is also part of support shaft 36' and engages gear wheel 37. Gear wheel 37 is mounted coaxially around intermediate sleeve 29 and is supported on bearings 38 mounted on an external portion of intermediate sleeve 29. In addition, gear wheel 39 engages gear wheel 37. Gear wheel 39 is part of shaft 40 mounted idle on ring 41. Gear wheel 42 is also part of shaft 40.

Gear wheel 42 engages gear wheel 43 which is connected to the end of rear sleeve 44 by means of a flange type connection using bolts (shown but not numbered). Rear sleeve 44 is provided with keys and key ways 45 which engage corresponding keys and keyways present on the outer surface of inner shaft 21. Rear sleeve 44 is mounted on bearings 46 of frame structure 23. Ring 41 is disposed around rear sleeve 44 and is supported on bearings 47, which are mounted on an external portion of rear sleeve 44. Thus, rotations like ±R and ±∂R imparted by motor M1 to intermediate sleeve 29, may be transmitted through the chain of gear wheels 35, 36, 37, 39, 42 and 43 to rear sleeve 44. Ultimately, this configuration simultaneously transmits the same rotational motions to inner shaft 21 as are being provided to outer shaft 20 by motor M1.

Radial stratification motions S1 or S2 may be obtained by imparting relative rotations ±θ to inner shaft 21. As shown in FIG. 4, this can be achieved by mounting gear wheel 48 on ring 41 and engaging pinion wheel 49 of motor M2 with gear wheel 48. In this configuration, motor M2 can impart relative rotations ±θ to rear sleeve 44 by means of the chain of gear wheels 49, 48, 42, and 43. Ultimately, this imparts relative rotations ±θ to inner shaft 21 through the connection of keys and keyways 45.

With reference to FIG. 4, it can be seen that inner shaft 21 is supported along its length by outer shaft 20 and by sleeve 44 at the left hand side of the drawing. Sleeve 44 is supported on frame structure 23 through bearings 46. Inner shaft 21 and outer shaft 20 are also supported with respect to frame structure 23 by bearing balls 27, which are disposed between outer shaft 20 and intermediate sleeve 29 as well as between outer shaft 20 and front sleeve 22. Intermediate sleeve 29 contacts frame 23 through bearings 29'. Front sleeve 22 contacts frame 23 through bearings 22'.

In order to combine rotation motions ±R and ±∂R, translation motions T1 and T2, and relative rotation ±θ so that winding needle 12 is able to move with trajectories that match a variety of pole configurations, motors M0, M1 and M2 are connected to power and control unit 53 via respective signal and supply lines 54, 55, and 56. Power and control unit 53 comprises a clock, microprocessor, memory, and programming hardware to command motors M0, M1 and M2 to apply torque and speed performance which synchronizes motions ±R and ±∂R, translation motions T1 and T2, and relative rotation ±θ according to programmed algorithms. The programmed algorithms will be directly related to the trajectories of needle 12 that are required to conform to the geometry of various pole structures.

During the motions of needle 12, wire 13 may travel through inner shaft 21, as shown in FIGS. 3 and 4. Wire 13 comes from a wire store (not shown) that is to the left of rear sleeve 44, and travels towards needle 12. Wire 13 may be tensioned during its travel from the wire store to needle 12 by using a wire tensioning unit (not shown), which applies tension on wire 13 at a location that is between the wire store and rear sleeve 44.

Thus, improved systems and methods for providing a dynamo-electric machine component wire winding apparatus is provided. One skilled in the art will appreciate that the present invention can be practiced by other than the described embodiments, which are presented for the purpose of illustration and not of limitation.

What is claimed is:

1. Apparatus for winding wire coils onto dynamo-electric machine components comprising:

a needle assembly configured to wind wire onto the machine component;

an outer shaft operationally engaged with the needle assembly, said outer shaft configured to simultaneously impart to the needle assembly rotational motion about a central axis and translational motion along the central axis;

an inner shaft operationally engaged with the needle assembly and the outer shaft configured to mirror the rotational motion of the outer shaft about the central axis, said inner shaft further configured to rotate about the central axis in relation to the outer shaft to provide stratification motion to the needle assembly substantially perpendicular to the central axis;

a first sleeve coaxially disposed about a first portion of the outer shaft configured to rotate about the central axis to impart translational motion to the outer shaft; and a first motor configured to rotate said first sleeve about the central axis;

wherein the first portion of the outer shaft and the first sleeve possess corresponding helical channels for translating the rotational motion of the first sleeve into translational motion of the outer shaft.

2. The apparatus of claim 1 wherein the first sleeve is disposed to the rear of the needle assembly.

3. The apparatus of claim 1 further comprising:

a second sleeve disposed coaxially over a second portion of the outer shaft configured to impart rotational motion to the outer shaft; and a second motor configured to rotate said second sleeve about the central axis.

4. The apparatus of claim 3 further comprising:
gear mechanism for transmitting the rotational motion of the outer shaft to the inner shaft, wherein at least a portion of the gear mechanism is disposed coaxially over the second sleeve.

5. The apparatus of claim 3 wherein the second sleeve is disposed to the rear of the first sleeve.

6. The apparatus of claim 3 wherein the second sleeve and the second portion possess corresponding keys and keyways for transmitting rotational motion.

7. The apparatus of claim 3 further comprising:
a third sleeve disposed coaxially over a portion of the inner shaft configured to impart rotational motion to the inner shaft; and
gear mechanism for transmitting the rotational motion of the outer shaft to the third sleeve.

8. The apparatus of claim 7 wherein the third sleeve is disposed to the rear of both the first sleeve and the second sleeve.

9. The apparatus of claim 7 wherein the third sleeve and the portion of the inner shaft possess corresponding keys and keyways for imparting rotational motion.

10. The apparatus of claim 7 further comprising:
a third motor configured to rotate the third sleeve about the central axis to impart stratification motion to the needle assembly.

11. The apparatus of claim 3 further comprising:
a third sleeve disposed coaxially over a portion of the inner shaft configured to impart rotational motion to the inner shaft; and
gear mechanism for transmitting the rotational motion imparted to the second sleeve by the second motor to the third sleeve.

12. The apparatus of claim 11 further comprising:
a third motor configured to rotate the inner shaft about the central axis in relation to the outer shaft to provide stratification motion to the needle assembly.

13. The apparatus of claim 1 further comprising:
a rotatable disc disposed substantially coaxially about the central axis operationally engaged with the needle assembly and the inner shaft, wherein rotational motion of the disc relative to the outer shaft about the central axis provides stratification motion to the needle assembly.

14. The apparatus of claim 13 wherein a face of the rotatable disc further comprises a spiral groove for receiving a pin fixedly attached to the needle assembly, wherein rotation of the rotatable disc causes the pin to slide along the spiral groove and impart stratification motion to the needle assembly.

15. A method for winding wire coils onto dynamo-electric machine components comprising:
providing a needle assembly with simultaneous rotational motion about a central axis and translational motion along the central axis through an outer shaft operationally engaged with the needle assembly;
providing an inner shaft operationally engaged with the needle assembly and the outer shaft configured to mirror the rotational motion of the outer shaft about the central axis;
rotating said inner shaft about the central axis in relation to the outer shaft to provide stratification motion to the needle assembly substantially perpendicular to the central axis; and
rotating a first sleeve coaxially disposed about a first portion of the outer shaft using a first motor to impart translational motion to the outer shaft.

16. The method of claim 15 further comprising:
providing the first portion of the outer shaft and the first sleeve with corresponding helical channels for translating the rotational motion of the first sleeve into translational motion of the outer shaft.

17. The method of claim 15 further comprising:
providing rotational motion to the outer shaft by rotating a second sleeve disposed coaxially over a second portion of the outer shaft about the central axis using a second motor, wherein the second sleeve is configured to impart rotational motion to the outer shaft.

18. The method of claim 17 further comprising:
transmitting the rotational motion of the outer shaft to the inner shaft through a gear mechanism, wherein at least a portion of the gear mechanism is disposed coaxially over the second sleeve.

19. The method of claim 17 further comprising:
providing the second sleeve and the second portion of the outer shaft with corresponding keys and keyways for transmitting rotational motion.

20. The method of claim 17 further comprising:
providing rotational motion to the inner shaft by transmitting the rotational motion of the outer shaft through a gear mechanism to a third sleeve disposed coaxially over a portion of the inner shaft, wherein the third sleeve is configured to transmit rotational motion to the inner shaft.

21. The method of claim 20 further comprising:
providing the third sleeve and the portion of the inner shaft with corresponding keys and keyways for transmitting rotational motion.

22. The method of claim 20 further comprising:
rotating the third sleeve about the central axis using a third motor to provide stratification motion to the needle assembly.

23. The method of claim 17 further comprising:
providing rotational motion to the inner shaft by transmitting the rotational motion provided to the second sleeve by the second motor through a gear mechanism to a third sleeve disposed coaxially over a portion of the inner shaft, wherein the third sleeve is configured to transmit rotational motion to the inner shaft.

24. The method of claim 23 further comprising:
providing stratification motion to the needle assembly by rotating the inner shaft about the central axis in relation to the outer shaft using a third motor.

25. The method of claim 15 further comprising:
providing a rotatable disc disposed substantially coaxially about the central axis operationally engaged with the needle assembly and the inner shaft; and
rotating the disc relative to the outer shaft about the central axis to provide stratification motion to the needle assembly.

26. The method of claim 25 further comprising:
providing a face of the rotatable disc with a spiral groove for receiving a pin fixedly attached to the needle assembly; and
rotating the rotatable disc to cause the pin to slide along the spiral groove and provide stratification motion to the needle assembly.

* * * * *